Feb. 8, 1966 T. S. TE VELDE 3,234,391

ELECTRO-OPTICAL COUNTER

Filed July 13, 1962 2 Sheets-Sheet 1

INVENTOR
TIES S. TE VELDE
BY
Frank R. Jifani
AGENT

ELECTRO-OPTICAL COUNTER

INVENTOR.
TIES S. TE VELDE
BY Frank R. Jifari
AGENT

United States Patent Office 3,234,391

Patented Feb. 8, 1966

3,234,391

ELECTRO-OPTICAL COUNTER

Ties Siebolt Te Velde, Emmasingel, Eindhoven, Netherlands, assignor to North American Philips Company, Inc., New York, N.Y., a corporation of Delaware Filed July 13, 1962, Ser. No. 209,495
Claims priority, application Netherlands, Aug. 11, 1961, 268,135
4 Claims. (Cl. 250—209)

Figure 1:
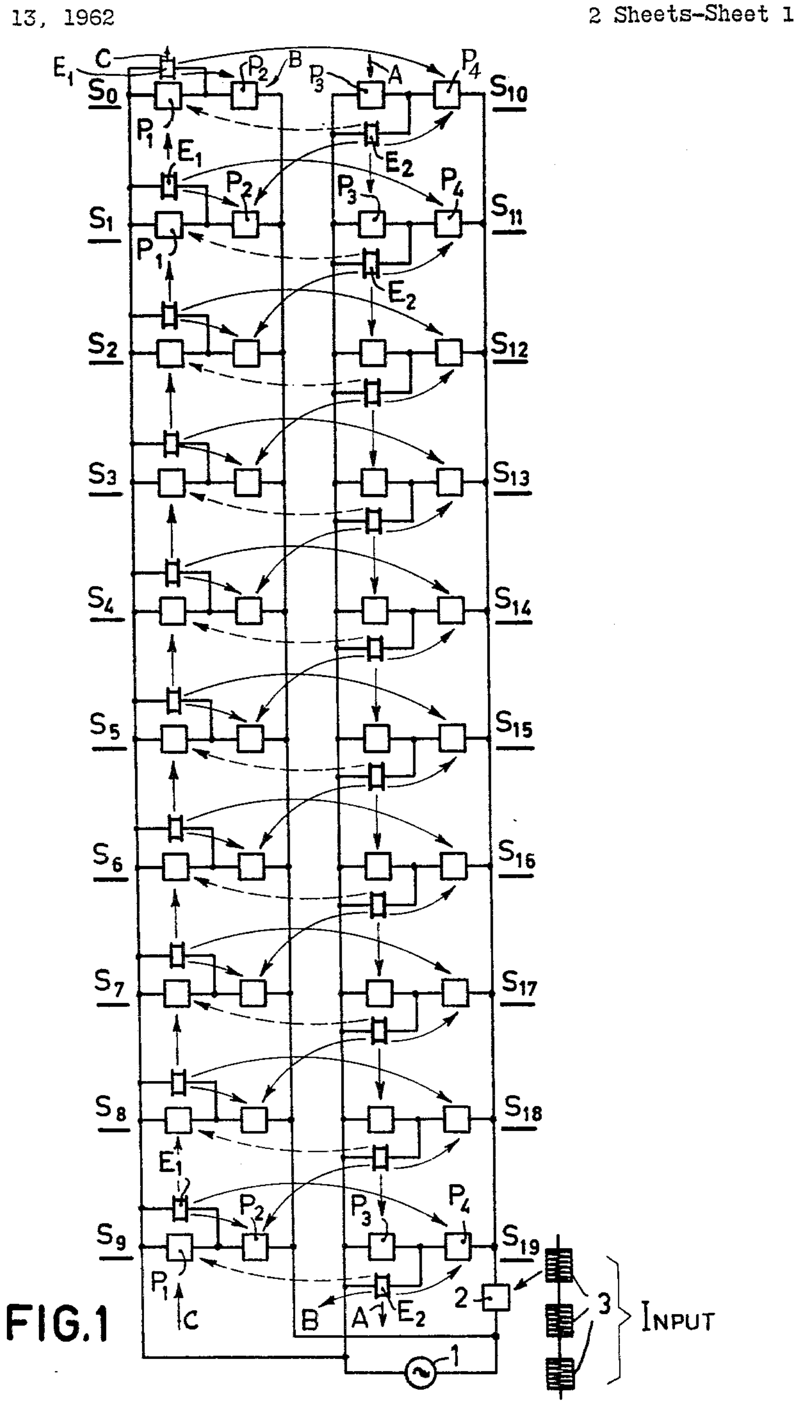

This invention relates to electro-optical circuits for counting pulses; in particular, it relates to such circuits specifically advantageous for counting pulses having arbitrary durations.

Electro-optical counters are known which comprise a series of switching stages connected in parallel with a supply-source, each stage including an electroluminescent element in parallel with a first conductor, and a second conductor connected in series with this parallel combination; the light from the electroluminescent element in a stage is adapted to irradiate the second photoconductor in order to decrease the resistance thereof and maintain the electroluminescent element in the radiating state.

In a counter circuit of known type the various stages are so located that the second photoconductor of a stage is irradiated by the light from the electroluminescent element of the preceding stage, in order to reduce the resistance of the photoconductor and bring the electroluminescent element connected in series with it into the radiating state during the occurrence of a pulse. In this arrangement, when a pulse has brought an electroluminescent element of a stage into the radiating state by lowering the resistance of a photoconductor, the radiation from this element lowers the resistance of a second photoconductor of the next-following stage, so that a pulse of long duration can bring the electroluminescent element of the last-mentioned stage in the radiating state.

For certain purposes it is desirable for the circuit arrangement to be brought into a next state at the beginning of a pulse, the state of the circuit not being allowed to vary for the duration of the pulse.

It is a primary object of the invention to provide an electro-optical counter circuit in which circuit states are changed at the beginning of a pulse and remain unchanged for the duration of the pulse. Stated another way, the object is to provide an electro-optical counter circuit which will operate effectively regardless of pulse duration.

In accordance with one aspect of the invention, an electro-optical counter includes, in addition to the first series of switching stages, a second series comprising a plurality of switching stages equal in number to those of the first series and similar in arrangement connected in parallel to a pulse source delivering the said pulses; the stages of the second series are arranged for irradiating the first photoconductor of a stage by the light from the electroluminescent element of a preceding stage, in order to decrease the resistance thereof and maintain the electroluminescent element connected in parallel therewith in the non-radiating state; further, the stages of the two series are arranged so that the second photoconductor of a stage of the second series is irradiated by the light from the electroluminescent element of a stage of the first series, in order to decrease the resistance thereof and bring the electroluminescent element connected in series with it into the radiating state during a pulse from the pulse source, and for irradiating the second photoconductor of the next stage of the first series by the light from the electroluminescent element of the said stage of the second series, in order to decrease the resistance thereof and bring the electroluminescent element connected in series with it into the radiating state.

In accordance with another aspect of the invention, the above-described electro-optical counter may be combined with a similar counter, the combined arrangement being brought into sequential states by means of pulses delivered by different pulse sources, the states succeeding one another in different directions depending on the originating pulse source. The initial states of the two counters are always the same. According to the invention, in such combined arrangement the stages of the two series are arranged for irradiating the first photoconductor of a stage of the first series by the electroluminescent element of the corresponding stage of the second series, in order to decrease the resistance of the photoconductor and bring the electroluminescent element connected in parallel with it into the non-radiating state.

Figure 2:
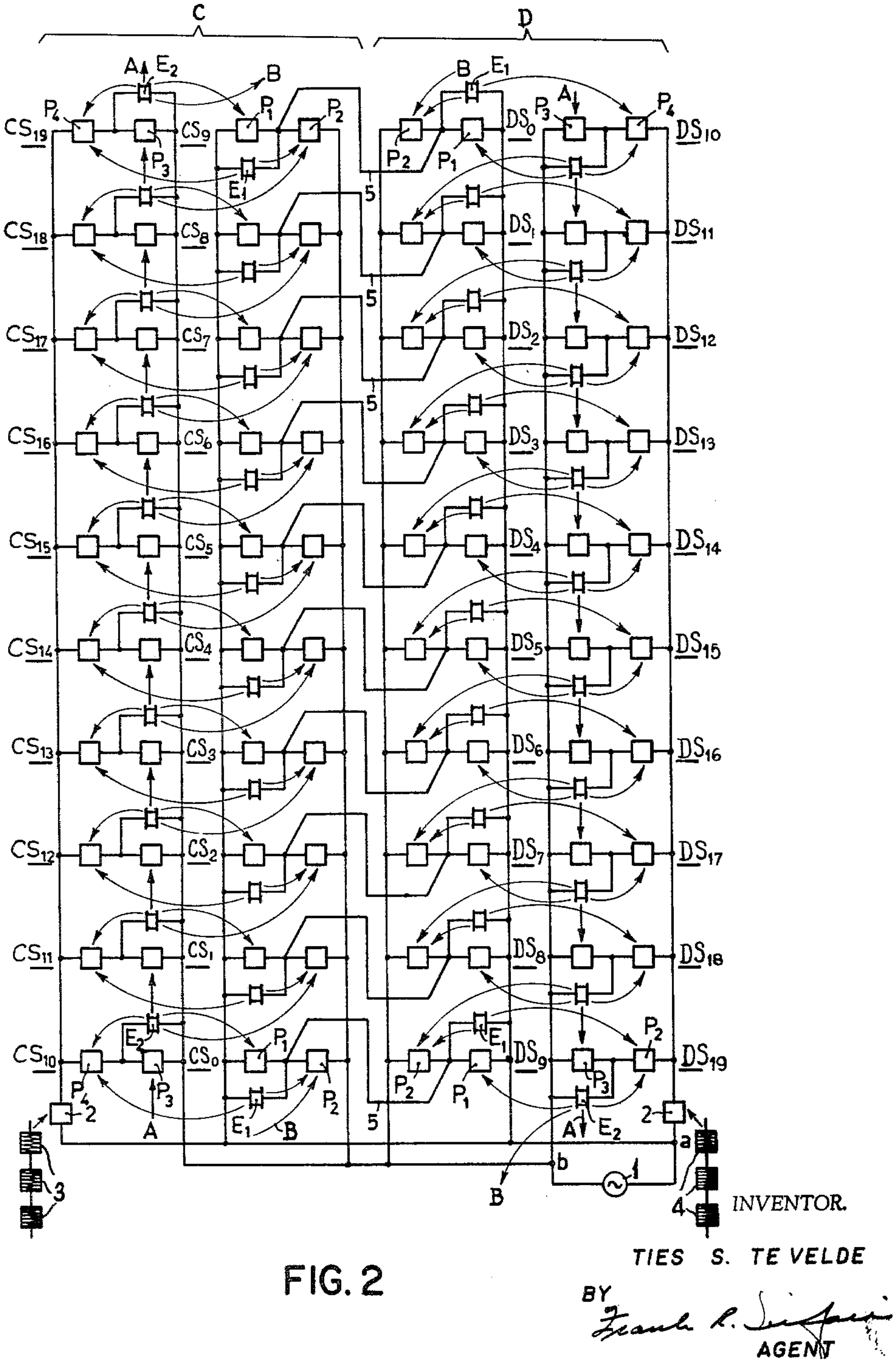

In order that the invention may be readily carried into effect, it will now be described in detail, by way of example, with reference to the accompanying schematic diagrams, in which:

FIGURE 1 shows one embodiment of an electro-optical counter according to the invention; and FIGURE 2 shows one embodiment of a combined electro-optical counter according to the invention. Identical switching elements in both figures are indicated by the same reference numerals.

Electroluminescent elements are indicated in the figures by reference letter E and photoconductors by reference letter P. The circuit shown in FIGURE 1 comprises a first series of switching stages S0 to S9 which are connected in parallel to the terminals of a supply source 1. Each switching stage includes an electroluminescent element E1 to which a photoconductor P1 is connected in parallel; a photoconductor P2 is connected in series with this parallel combination. An electroluminescent element E1 is adapted to irradiate the photoconductor P2 of the same stage. The optical coupling between an electroluminescent element and a photoconductor is indicated in the drawing by a thin line provided with an arrow in the direction of radiation. Each stage described has two stable states. In one state the electroluminescent element E1 radiates energy and the photoconductors P2 and P1 have a low and a high resistance value respectively. The switching state is then "on." In the other state the electroluminescent element E1 does not radiate and the photoconductor P2 has a high resistance value. The switching stage is then "off." In this state the resistance value of photoconductor P1 may be either high or low. Irradiation of the photoconductor P2 with energy of a suitable wave-length causes a decrease in its resistance, resulting in an increase of the voltage across the electroluminescent element E1 connected in series with it. The supply source 1 has a voltage such that the element starts radiating energy when this occurs. The intensity of the radiation on photoconductor P2 suffices to maintain the resistance thereof at a low value. The electroluminescent element E1 thus remains in the radiating state. Irradiation of photoconductor P1 causes a decrease in its resistance, resulting in a decrease of the voltage across the electroluminescent element E1 connected in parallel with it. The intensity of the radiation of the said element thus decreases, resulting in an increase in the resistance of the photoconductor P2. This increased resistance decreases the intensity of the radiation, and this effect is regenerative. After a short time interval the switching stage is in the other state. The irradiation of photoconductor P1 may be removed after the regenerative effect has set in, but may naturally also be maintained.

The circuit of FIG. 1 also comprises a second series of switching stages S10 to S19 which are all connected in parallel to the series-combination of supply source 1 and a photoconductor 2. Each stage includes an electroluminescent element E2 to which a photoconductor P3 is connected in parallel, and a photoconductor P4 which is connected in series with this parallel combination. The pulses to be counted are applied to the photoconductor 2 in the form of radiation pulses 3 of suitable intensity. In a similar manner as in the stages of the first series, the light from the electroluminescent element E2 of a stage of the second series is adapted to irradiate the photoconductor P4, connected in series with it. These switching stages have various different states. In one state the photoconductor P4 has a low resistance value and the electroluminescent element E2 does not radiate. In a second state, which may occur during a pulse 3, the photoconductor P4 has a low resistance value and the electroluminescent element E2 radiates energy. The stage is then "on." In a third state the two photoconductors P3 and P4 have low resistance values and the electroluminescent element E2 does not radiate. In the fourth state the photoconductors P3 and P4 have high resistance values and the electroluminescent element E2 does not radiate. The stage is then "off."

The circuit of FIG. 1 operates as follows, the starting position being assumed to be that in which the stage SO is "on." In this state the light from the electroluminescent element E1 of stage S0 irradiates photoconductor P4 of stage S10 and reduces its resistance to a low value. This stage is then in the sensitive state. The other photoconductors P4 have a high resistance. A light pulse on the photoconductor 2 decreases the resistance thereof so that substantially the full voltage of supply source 1 is then set up across the parallel-connected stages S10 to S19. However, only the electroluminescent element E2 in stage S10 acquires a potential sufficient for radiating energy. The electroluminescent element E2 of stage S10 irradiates the photoconductor P4 which is connected in series with it, the photoconductor P3 of the next stage S11 and the photoconductor P2 of stage S1. The radiation on photoconductor P4 maintains the resistance thereof at a low value so that electroluminescent element E2 of stage S10 keeps radiating during the pulse. The radiation on the photoconductor P2 of stage S1 switches on the stage S1. The radiation on the photoconductor P3 of stage S11 reduces the resistance thereof so that the radiation from the electroluminescent element E1 of stage S1 on the photoconductor P4 of stage S11 cannot switch on stage S11. Stage S11 thus remains insensitive during the pulse. It has been proposed that the electroluminescent element E1 of a stage of the first series irradiate the photoconductor P1 of the preceding stage. Stage S1 than switches off the preceding stage S0. Stage S0 may be switched off in a different way however. To this end the electroluminescent element E2 of stage S10 irradiates the photoconductor P1 of stage S0 through the optical coupling shown by the broken line. This method of switching off is advantageously applicable to the combined arrangement of FIGURE 2 which will be described hereinafter. After the end of radiation pulse 3 the photoconductor 2 returns to the high resistance condition so that stage S10 is switched off. The state of the arrangement after the end of the first pulse is then such that stage S1 is "on" and stage S11 is in the sensitive state due to the suppression of the radiation on the photoconductor P3.

A second radiation pulse 3 switches on the stage S11, which in turn switches on stage S2 and maintains stage S12 in the insensitive state till the end of the pulse. Stage S1 is switched off either by stage S2 or stage S11. After the end of the pulse, stage S11 switches off and stage S12 passes to the sensitive state, and so on. After the end of the ninth radiation pulse, stage S18 is "on" and stage S19 is in the sensitive state. The next pulse switches on stage S19 and the electroluminescent element E2 of stage S19 irradiates the photoconductor P3 of stage S10 through the optical coupling indicated by A and the photoconductor P2 of stage S9 through the optical coupling indicated by B. Stage S19 then switches on stage S0 and maintains stage S10 in the insensitive state. Stage S9 is switched off either by stage S0 through the optical coupling indicated by C, or by stage S19 through the optical coupling shown by the broken line.

It should be noted that the circuit may be adjusted to an initial state in which any one of the stages S0 to S9 is "on," in a known manner which is not part of this invention. The state of the circuit may be read in known manner by utilizing the radiation of the electroluminescent elements. A radiation pulse may also be derived from the electroluminescent element E2 of stage S19 to irradiate a photoconductor 2 of an additional counter circuit which may be either a known circuit or one in accordance with the invention as described above.

FIGURE 2 shows a combination of two counting circuits C and D of the kind in FIGURE 1. In the description of the combined circuit following below, the index C followed by a reference numeral indicates a switching element of circuit C and the index D followed by a reference numeral indicates a switching element of circuit D.

Radiation pulses 3 are applied to a photoconductor C2 and switch on successively the stages CS0 to CS9. Radiation pulses 4 are applied to a photoconductor D2 and switch on successively the stages DS0 to DS9. The arrangements C and D are fed from the same supply source 1 and are coupled together by means of transverse connections 5 as shown. These transverse connections, together with the supply leads of the supply source, form a parallel combination between the photoconductors P2 and between the photoconductors P1 and the electroluminescent elements E1 of the stages CS0 and DS9, of the stages CS1 and DS8, etc. Each pair of stages CS0, DS9 and CS1, DS8, etc. is in this case in the same state. The operation is as follows, it being assumed that the stages CS4 and DS5 are "on": the corresponding stages CS14 and DS15 are in the sensitive state. A radiation pulse 3 switches on stage CS14. The electroluminescent element E2 of stage S14 irradiates the photoconductor P2 of stage CS5, the latter being connected parallel to the photoconductor P2 of stage DS4. Stage CS14 then switches the stages CS5 and DS4 to the "on" state simultaneously. The electroluminescent element E2 of stage CS14 also irradiates the photoconductor P1 of stage CS4, the latter being connected parallel to the electroluminescent element E1 of stage DS5. Stage CS14 then switches off the stages CS4 and DS5 simultaneously and maintains stage CS15 in the insensitive state during the pulse. After the end of the pulse, stage CS14 switches off and the stages CS5 and DS4 are "on", while the stages CS15 and DS14 are in the sensitive state. A subsequent pulse 3 may switch on stage CS15 and the switching action continues wtih succeeding pulses. The direction of counting is thus from stage CS0 to stage CS9. A radiation pulse 4 on photoconductor D2, however, switches on the sensitive state of circuit D. In this case stage DS14 is switched on, which in turn switches on the stages DS5 and CS4 and switches off the stages DS4 and CS5. During the pulse, stage DS14 maintains the next stage DS15 in the insensitive state. After the end of the pulse, stage DS15 and stage SC14 are in the sensitive state. A next pulse 3 may switch on stage DS15 and so forth. The direction of counting is thus from stage DS0 to stage DS9.

It shoud be noted in connection with the physical configuration that it is possible for similar elements which are connected in parallel to be united to form a unitary assembly. The specific physical configuration, however, forms no part of this invention. Likewise, the physical arrangements of the photoconductors relative to the electroluminescent elements will be apparent to those skilled in the art by referring to the optical couplings shown in the diagrams.

If photoconductor is irradiated by more than one electroluminescent element the photoconductor shown as one element my be obtained in known manner by a plurality of photoconductors connected in parallel, each irradiated by one electroluminescent element. Thus, reference to a photoconductor herein includes a plurality of individual photoconductors connected in parallel.

While the invention has been described with respect to specific embodiments, various modifications and variations thereof will be readily apparent to those skilled in the art without departing from the inventive concept, the scope of which is set forth in the appended claims.

What is claimed is:

1. An electro-optical counter circuit for counting pulses of arbitrary duration, comprising: a first series of switching stages all connected in parallel with a supply source, each stage including the parallel combination of an electroluminescent element and a first photoconductor together with a second photoconductor connected in series with said parallel combination, the electroluminescent element in a particular stage of said first series being adapted to irradiate the second photoconductor in said particular stage in order to reduce its resistance and maintain the electroluminescent element in the radiating state, a second series of switching stages all connected in parallel with a pulse source, each stage of the second series including the same components and connections as each stage of the first series, each stage of the first series having a corresponding stage in the second series, the electroluminescent element of a stage of the second series being adapted to irradiate the first photoconductor of the next-following stage of the second series in order to decrease its resistance and maintain the electroluminescent element connected in parallel therewith in the non-radiating state, the electroluminescent element of a stage of the first series being adapted to irradiate the second photoconductor of a corresponding stage of the second series in order to decrease its resistance and bring the electroluminescent element connected in series with it into the radiating stage during a pulse from the pulse source, the electroluminescent element of a stage of the second series being adapted to irradiate the second photoconductor of the next-following stage of the first series in order to decrease its resistance and being the electroluminescent element of said next-following stage into the radiating state.

2. A counting circuit as claimed in claim 1, further comprising third and fourth series of switching stages identical to said first and second series, respectively, the corresponding elements of the first and third series being connected in parallel, said fourth series being connected in parallel with an additional pulse source, pulses from said pulse source activating said circuit to count in on direction, pulses from said additional pulse source activating said circuit to count in the other direction.

3. An electro-optical counter circuit for counting pulses of arbitrary duration, comprising: a first series of switching stages all connected in parallel with a supply source, each stage including the parallel combination of an electroluminescent element and a first photoconductor together with a second photoconductor connected in series with said parallel combination, the electroluminescent element in a particular stage of said first series being adapted to irradiate the second photoconductor in said particular stage in order to reduce its resistance and maintain the electroluminescent element in the radiating state, a second series of switching stages all connected in parallel with a pulse source, each stage of the second series including the same elements and connections as each stage of the first series, each stage of the first series having a corresponding stage in the second series, the electroluminescent element of a stage of the second series being adapted to irradiate the first photoconductor of the next-following stage of the second series in order to decrease its resistance and maintain the electroluminescent element connected in parallel therewith in the non-radiating state, the electroluminescent element of a stage of the first series being adapted to irradiate the second photoconductor of a corresponding stage of the second series in order to decrease its resistance and bring the electroluminescent element connected in series with it into the radiating state during a pulse from the pulse source, the electroluminescent element of a stage of the second series being adapted to irradiate the second photoconductor of the next-following stage of the first series in order to decrease its resistance and bring the electroluminescent element of said next-following stage in the radiating state, the electroluminescent element of a stage of the second series being adapted to irradiate the first photoconductor of the corresponding stage of the first series, in order to decrease its resistance and bring the electroluminescent element connected in parallel therewith into the non-radiating state.

4. A counting circuit as claimed in claim 3, further comprising third and fourth series of switching stages identical to said first and second series, respectively, the corresponding elements of the first and third series being connected in parallel, said fourth series being connected in parallel with an additional pulse source, pulses from said pulse source activating said circuit to count in one direction, pulses from said additional pulse source activating said circuit to count in the other direction.

References Cited by the Examiner

UNITED STATES PATENTS 2,999,165 9/1961 Lieb ---------------- 250—213

OTHER REFERENCES

O'Connell et al., IBM Technical Disclosure Bulletin, volume 4, No. 7, December 1961.

RALPH G. NILSON, *Primary Examiner.*

ARCHIE R. BORCHELT, *Examiner.*